United States Patent
Wang

(10) Patent No.: US 7,134,030 B2
(45) Date of Patent: Nov. 7, 2006

(54) CIRCUIT CONTROLLING POWER SUPPLIED TO A CPU BASED ON ONLY A POWER SIGNAL OR A COMBINATION OF A POWER SIGNAL AND AN ADJUSTMENT SIGNAL

(75) Inventor: Cheng-Chih Wang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 408 days.

(21) Appl. No.: 10/678,089

(22) Filed: Oct. 6, 2003

(65) Prior Publication Data
US 2004/0210779 A1 Oct. 21, 2004

(30) Foreign Application Priority Data
Apr. 17, 2003 (TW) .............................. 92108885 A

(51) Int. Cl.
*G06F 1/26* (2006.01)
(52) U.S. Cl. ..................... 713/320; 713/320; 713/324; 713/330
(58) Field of Classification Search ................ 713/300, 713/322, 340, 500, 501, 600, 320, 324, 330
See application file for complete search history.

(56) References Cited

U.S. PATENT DOCUMENTS

| | | | |
|---|---|---|---|
| 6,525,599 B1 * | 2/2003 | Nguyen et al. ............. 327/544 |
| 6,772,356 B1 * | 8/2004 | Qureshi et al. ............. 713/321 |
| 6,907,535 B1 * | 6/2005 | Fang ........................... 713/322 |
| 6,963,992 B1 * | 11/2005 | Cheng et al. ............... 713/501 |
| 2002/0109489 A1 * | 8/2002 | Shaver et al. .............. 323/283 |
| 2003/0097602 A1 * | 5/2003 | Bigbee et al. ............. 713/500 |
| 2003/0229816 A1 * | 12/2003 | Meynard .................... 713/600 |
| 2004/0080347 A1 * | 4/2004 | Wong et al. ................ 327/143 |
| 2004/0236972 A1 * | 11/2004 | Brown et al. ............... 713/300 |
| 2005/0071705 A1 * | 3/2005 | Bruno et al. ................ 713/500 |

* cited by examiner

Primary Examiner—Thomas Lee
Assistant Examiner—Malcolm Cribbs
(74) Attorney, Agent, or Firm—Birch, Stewart, Kolasch & Birch, LLP

(57) ABSTRACT

A power voltage control circuit for a CPU. The CPU has at least one power indication pin to output a power indication signal. In the control circuit, a register stores an adjustment signal, and combination unit adds the power indication signal and the adjustment signal to output a first signal. A selection unit receives the power indication signal and the adjustment signal. A selection controller controls the selection unit to output the power indication signal or the adjustment signal. A PWM controller supplies a power voltage to the CPU according to the power indication signal or the adjustment signal from the selection unit.

13 Claims, 2 Drawing Sheets

CIRCUIT CONTROLLING POWER SUPPLIED TO A CPU BASED ON ONLY A POWER SIGNAL OR A COMBINATION OF A POWER SIGNAL AND AN ADJUSTMENT SIGNAL

This nonprovisional application claims priority under 35 U.S.C. §119(a) on Patent Application Ser. No. 092108885 filed in TAIWAN on Apr. 17, 2003, which is herein incorporated by reference.

BACKGROUND OF THE INVENTION

1. Field of the Invention

The present invention relates to a control circuit, and more particularly, to a power voltage control circuit for a central processing unit (CPU).

2. Description of the Related Art

CPUs in personal computers generally have at least one power indication (VID) pin to output a power indication signal $S_{VID}$ and to control the received power voltage, as shown in FIG. 1. When CPUs of different manufacture require different power voltages, the desired power voltage can be determined according to the power indication signal from the PID pin.

In the conventional method a CPU is overclocked by adjusting both the operating frequency of the CPU and the power voltage of the CPU. As shown in FIG. 2, a default value can be stored in the VID register 16 through an interface bus 14 such as a system bus, an I²C bus, or the like. VID controller 18 produces a selection signal Sel, and multiplexer (MUX) 20 outputs the signal $S_{VID}$ from the CPU 10 or the signal $R_{VID}$ from the VID register 16. The MUX 20 outputs the signal $R_{VID}$ to PWM controller 12 according to the selection signal Sel when the CPU is overclocked, so that the correct power voltage is output to the CPU.

The signal $S_{VID}$ from the power indication pin, however, fluctuates continuously as the load and operating temperature of the CPU 10 (based on specification VRD 10.0 proposed by Intel) fluctuates. As shown in FIG. 2, the control signal $S_{VID}$ from the CPU is isolated from the PWM controller 12 by the MUX 20 according to selection signal Sel. Consequently, the control circuit cannot adjust the power voltage output to the CPU 10 as CPU load and operating temperature fluctuate. Thus, the conventional control circuit as shown in FIG. 2 cannot efficiently provide the correct voltage necessary to overclock the CPU 10.

SUMMARY OF THE INVENTION

It is therefore an object of the present invention to provide a control circuit capable of dynamically adjusting power voltage as CPU in load and operating temperature fluctuate while simultaneously providing incremental voltage to overclock the CPU.

The control circuit of the present invention is applied to a CPU with at least one power indication pin to output a power indication signal. In the control circuit, a register stores an adjustment signal, and a combination unit adds the power indication signal and an adjustment signal to output a first signal. A selection unit receives the power indication signal and the adjustment signal. A selection controller controls the selection unit to output one of the power indication signal and the adjustment signal. A PWM controller produces a power voltage to the CPU according to the power indication signal or the adjustment signal from the selection unit.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

Figure 1:
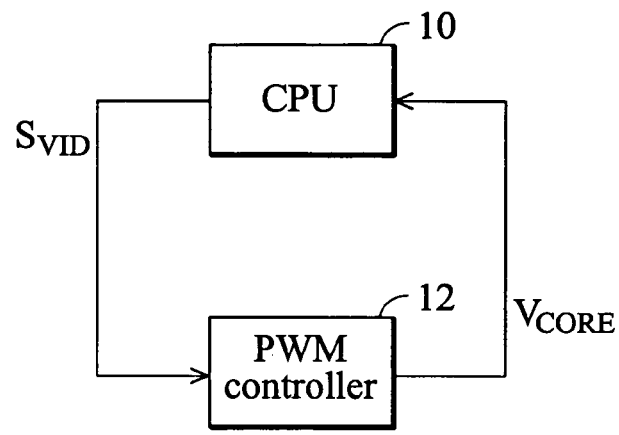
FIG. 1 is a schematic diagram of conventional control circuit for a CPU.
Figure 2:
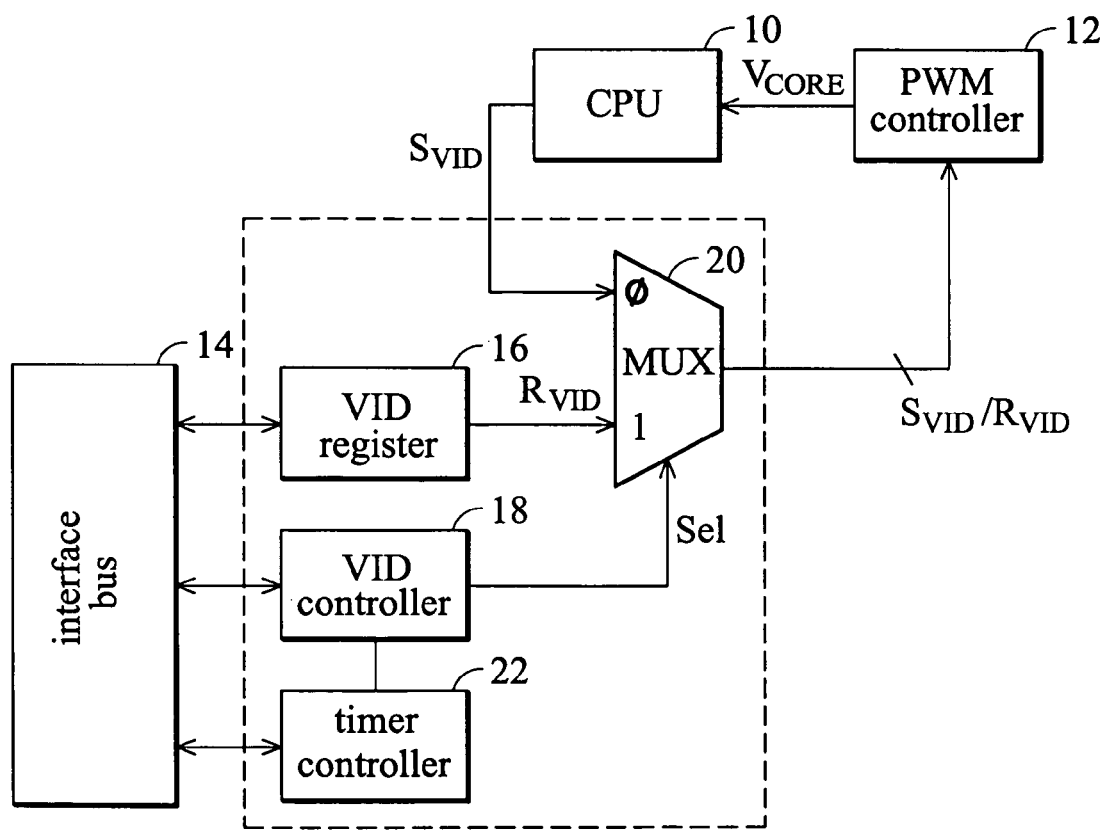
FIG. 2 shows another convention control circuit for overclocking a CPU.
Figure 3:
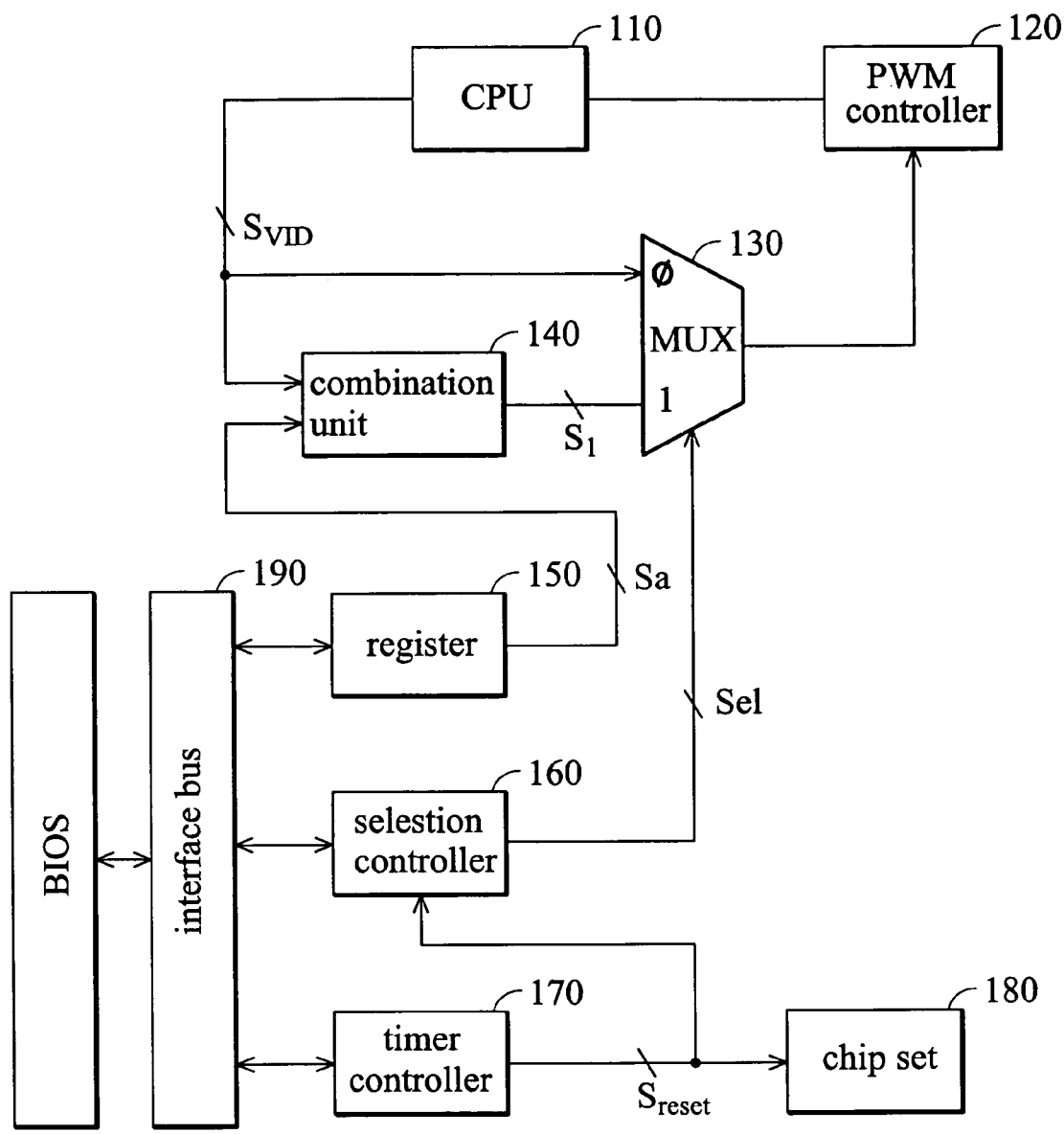
FIG. 3 is a diagram illustrating the control circuit of the present invention.

FIG. 3 shows the power voltage control circuit 100 of a CPU according to the present invention. The CPU 110 is disposed in a computer system with a chip set 180, and has at least one power indication pin to output a power indication signal $S_{VID}$.

In FIG. 3, the control circuit 100 for CPU 110 has a pulse width modulation (PWM) controller 120, a selection unit 130, a combination unit 140, a register 150 and a selection controller 160.

The selection unit 130, for example, is a multiplexer with a first input terminal, a second input terminal and a control terminal, wherein the first input terminal is coupled to the power indication signals $S_{VID}$. In this embodiment, the register 150 is a digital register such as a nonvolatile memory or a backup device powered by a battery to store an adjustment signal Sa.

The combination unit 140 produces a first signal S1 to output to the second input terminal of the selection unit 130 according to the power indication signal $S_{VID}$ and the adjustment signal Sa. In this embodiment, the combination unit 140 is composed of a decoding unit, an adder and a coding unit (not shown). The decoding unit converts the power indication signal $S_{VID}$ into a digital value and outputs to the adder according to a VRD table. The adder then adds the digital value and the adjustment signal Sa, and outputs a second signal. Next, the coding unit coverts the second signal into the first signal $S_1$ and outputs to the second input terminal of the selection unit 130 according to the VRD table.

In another aspect of the present invention, the adjustment signal Sa can also be an analog signal from an external circuit. In this case, the combination unit 140 is an analog adder to add the power indication signal $S_{VID}$ and the adjustment signal and to serve as the first signal S1, and outputs the first signal S1 to the second terminal of the selection unit 130.

The selection controller 160 outputs a selection signal Sel to control the selection unit 130 to output one of the power indication signal $S_{VID}$ and the first signal S1. The PWM controller 120 is coupled to the selection unit 130, and produces a power voltage $V_{CORE}$ to the CPU 110 according to the power indication signal $S_{VID}$ or first signal $S_1$ from the selection unit 130.

In the control circuit 110 of the present invention, the selection unit 130 outputs the selection signal Sel from the CPU 110 to PWM controller 120 when CPU 110 operates in normal mode and is not overclocked. The PWM controller 120 then produces a power voltage $V_{CORE}$ to the CPU 110 according to the power indication signal $S_{VID}$. At this time, the power indication signal $S_{VID}$ changes as the load and operating temperature of the CPU 110 fluctuate fluctuate. Thus, the power voltage $V_{CORE}$ output from PWM controller 120 adjusts according to the power indication signal $S_{VID}$.

When the CPU 110 is overclocked, through the $I^2C$ bus or a system bus, a desired voltage increment or a desired voltage decrement is written into the register 150, and the selection signal Sel of the selection controller 160 is adjusted so that the selection unit 130 outputs the first signal $S_1$ at its second input terminal. Then, as in the conventional overclocking method, the operating frequency of the CPU 110 is appropriately adjusted.

Next, the computer system is rebooted. At this time, the combination unit 140 outputs a first signal S1 combined with the power indication signal $S_{VID}$ and the adjustment signal Sa to the second input terminal of the selection unit 130.

The PWM controller 120 produces a power voltage $V_{CORE}$ to the CPU 110 according to the first signal $S_1$. In this instance, the power indication signal $S_{VID}$ is adjusted as the load and operating temperature of the CPU 110 fluctuates. The combination unit 130 produces the first signal $S_1$ according to the adjustment signal Sa and the variable power indication signal $S_{VID}$. Thus, the power voltage output from the PWM controller 120 not only changes as the load and operating temperature of the CPU 110 fluctuates and the desired voltage increment is provided by the adjustment signal Sa, thereby the CPU 110 is overclocked.

The control circuit 100 of the present invention further has a timer controller 170. The timer controller 170, for example, acts as a monitor and outputs a signal to prevent shut down in the event of computer system failure when attempting to overclock the CPU 110.

That is, the timer controller 170 counts for a predetermined time interval after rebooting the computer system, and outputs a reset signal $S_{reset}$. If the CPU 110 overclock is successful and the computer operates normally after rebooting, the BIOS outputs a disable signal to terminate the counting of the timer controller 170 so that the timer controller 170 does not output the reset signal $S_{reset}$. The BIOS may not output the disable signal if the CPU 110 does not operate normally after rebooting. Thus, the timer controller 170 will count for a predetermined time interval and output the reset signal $S_{reset}$ to the selection controller 160 and the chipset of the computer system. According to the reset signal $S_{reset}$, the selection signal Sel of the selection controller 160 is adjusted so that the selection unit 130 outputs the power indication signal $S_{VID}$ to the PWM controller 120, and the computer system is rebooted. Namely, the computer system can be rebooted again in a non-overclock condition. Thus, the present invention can also prevent shut down when the computer system fails to overclock the CPU 110.

In the present invention, the power voltage output from the control circuit 100 is not only adjusted as the load and operating temperature of the CPU 110 fluctuates but also provides a desired voltage increment by the adjustment signal Sa. Therefore, the present invention can successfully overclock a CPU, even if the power indication signal of CPU fluctuates with variations in load and operating temperature.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power voltage control circuit for a CPU, wherein the CPU has at least one power indication pin to output a power indication signal, the control circuit comprising:
    a selection unit having a first input terminal coupled to the power indication pin, a second input terminal and a control terminal;
    a register to store an adjustment signal;
    a combination unit to produce a first signal and output to the second terminal of the selection unit according to the power indication signal and the adjustment signal;
    a selection controller to output a selection signal to the control terminal of the selection unit, such that the selection unit outputting one power indication signal or the first signal; and
    a PWM controller coupled to the selection unit to produce a power voltage to the CPU according to the power indication signal or the first signal.

2. The control circuit as claimed in claim 1, wherein the CPU is disposed in a computer system, the selection unit outputs the power indication signal when the computer system is operated in a normal mode, and the selection unit outputs the first signal when the computer system is operated in overclock mode.

3. The control circuit as claimed in claim 2, further comprising a timer controller for outputting a reset signal when the CPU does not operate normally in overclock mode, causing the power indication signal output from the selection unit thereby rebooting the computer system.

4. The control circuit as claimed in claim 2, wherein the register and the selection controller communicate with the BIOS of the computer system through an interface bus.

5. The control circuit as claimed in claim 3, wherein the timer controller counts for a predetermined time interval and outputs the reset signal after rebooting the computer system, the BIOS of the computer system outputs a disable signal to terminate counting by the timer controller when the CPU operates normally.

6. The control circuit as claimed in claim 1, wherein the combination unit comprises:
    a decode unit to convert the power indication signal into a digital value according to a corresponding relationship;
    an adder to add the digital value and the adjustment signal and output a second signal; and
    coding unit to convert the second signal into the first signal and output to the second terminal of the selection unit, according to the corresponding relationship.

7. The control circuit as claimed in claim 1, wherein the CPU adjusts the power indication signal according to load and operating temperature thereof.

8. A control circuit for power voltage of a CPU, wherein the CPU has at least one power indication pin to output a power indication signal, and the CPU adjusts the power indication signal according to load and operating temperature thereof, the control circuit comprising:

a selection unit having a first input terminal coupled to the power indication pin, a second input terminal and a control terminal;

a combination unit to produce a first signal and output to the second terminal of the selection unit according to the power indication signal and an adjustment signal;

a selection controller to output a selection signal to the control terminal of the selection unit, such that the selection unit outputting one power indication signal or the first signal; and a PWM controller coupled to the selection unit to supply a power voltage to the CPU according to the power indication signal or the first signal.

9. The control circuit as claimed in claim 8, wherein the CPU is disposed in a computer system, the selection unit outputs the power indication signal when the computer system is operated in a normal mode, and the selection unit outputs the first signal when the computer system is operated in overclock mode.

10. The control circuit as claimed in claim 9, further comprising a timer controller for outputting a reset signal when the CPU does not operate normally in overclock mode, causing the power indication signal to be output from the selection unit thereby rebooting the computer system.

11. The control circuit as claimed in claim 10, wherein the timer controller counts for a predetermined time interval and outputs the reset signal after rebooting the computer system, the BIOS of the computer system outputs a disable signal to stop the counting of the timer controller when the CPU operates normally.

12. The control circuit as claimed in claim 11, wherein the selection controller communicates with the BIOS of the computer system through an interface bus, and the adjustment signal is an analog signal from an external circuit.

13. The control circuit as claimed in claim 12, wherein the combination unit is an analog adder to add the power indication signal and the adjustment signal and output the first signal to the second terminal of the selection unit.

* * * * *